United States Patent
Yin et al.

(10) Patent No.: US 11,080,150 B2
(45) Date of Patent: Aug. 3, 2021

(54) METHOD FOR CREATING CONSISTENCY SNAPSHOT FOR DISTRIBUTED APPLICATION, APPARATUS, AND DISTRIBUTED SYSTEM

(71) Applicant: HUAWEI TECHNOLOGIES CO., LTD., Shenzhen (CN)

(72) Inventors: Wei Yin, Shenzhen (CN); Bin Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 124 days.

(21) Appl. No.: 16/584,862

(22) Filed: Sep. 26, 2019

(65) Prior Publication Data
US 2020/0042408 A1    Feb. 6, 2020

Related U.S. Application Data

(63) Continuation of application No. PCT/CN2018/080204, filed on Mar. 23, 2018.

(51) Int. Cl.
G06F 11/00    (2006.01)
G06F 11/14    (2006.01)
(Continued)

(52) U.S. Cl.
CPC ........ G06F 11/1469 (2013.01); G06F 9/461 (2013.01); G06F 11/1451 (2013.01);
(Continued)

(58) Field of Classification Search
CPC ............. G06F 11/1469; G06F 11/1451; G06F 11/1464; G06F 11/1471; G06F 9/461
See application file for complete search history.

(56) References Cited

U.S. PATENT DOCUMENTS

| | | | | |
|---|---|---|---|---|
| 5,802,267 A | * | 9/1998 | Shirakihara | G06F 11/1407 |
| | | | | 714/15 |
| 8,577,842 B1 | * | 11/2013 | Nagargadde | G06F 16/27 |
| | | | | 707/639 |

(Continued)

FOREIGN PATENT DOCUMENTS

| | | |
|---|---|---|
| CN | 101420439 A | 4/2009 |
| CN | 102103530 A | 6/2011 |
| CN | 105302922 A | 2/2016 |

OTHER PUBLICATIONS

Chandy and Lamport, Distributed Snapshots: Determining Global States of a Distributed System, ACM Transactions on Computer Systems, vol. 3, No. 1, Feb. 1985, pp. 63-75.

(Continued)

*Primary Examiner* — Philip Guyton
(74) *Attorney, Agent, or Firm* — Hauptman Ham, LLP

(57) ABSTRACT

A distributed system for creating a consistency snapshot for a distributed application includes a control node and multiple execution nodes including a source execution node, an intermediate execution node, and a leaf execution node. The source execution node receives a snapshot event, and generates a single-point snapshot of an application instance associated with the source execution node. Each of the intermediate execution node and the leaf execution node sequentially receives snapshot events separately sent by two parent nodes of the respective nodes, generates a single-point snapshot of an application instance associated with the respective nodes after receiving the first snapshot event, records a log of a task when executing the task triggered by another parent node different from a parent node sending the first snapshot event, and stops recording a log of a task triggered each time one snapshot event sent by a parent node is received subsequently.

15 Claims, 7 Drawing Sheets

(51) Int. Cl.
  *H04L 29/08*   (2006.01)
  *G06F 9/46*    (2006.01)

(52) U.S. Cl.
  CPC ...... *G06F 11/1464* (2013.01); *G06F 11/1471* (2013.01); *H04L 67/1097* (2013.01); *G06F 2201/84* (2013.01)

(56) References Cited

U.S. PATENT DOCUMENTS

| | | |
|---|---|---|
| 2013/0124475 A1 | 5/2013 | Hildenbrand et al. |
| 2016/0117228 A1 | 4/2016 | Farlee et al. |
| 2016/0179627 A1* | 6/2016 | Dusi .................. G06F 11/1438 714/19 |
| 2020/0042408 A1* | 2/2020 | Yin ..................... H04L 67/1097 |

OTHER PUBLICATIONS

Paris Carbone et al.,"Lightweight Asynchronous Snapshots for Distributed Dataflows", Jun. 29, 2015,total 8 pages.

\* cited by examiner

METHOD FOR CREATING CONSISTENCY SNAPSHOT FOR DISTRIBUTED APPLICATION, APPARATUS, AND DISTRIBUTED SYSTEM

CROSS-REFERENCE TO RELATED APPLICATIONS

This application is a continuation of International Application No. PCT/CN2018/080204, filed on Mar. 23, 2018, the disclosure of which is hereby incorporated by reference in its entirety.

TECHNICAL FIELD

The present invention relates to the field of IT technologies, and in particular, to a method for creating a consistency snapshot for a distributed application, an apparatus, and a distributed system.

BACKGROUND

A snapshot is an available copy of a specified dataset, and is used to record a copy of the dataset at a time point at which the copy starts. The snapshot may be applied to backup and restore data in the dataset. When a fault occurs on a storage device, and the dataset is unavailable, the snapshot of the dataset may be used to perform a data restoration operation, and content of the dataset recorded by the snapshot is restored.

A distributed application includes a plurality of application instances, and the application instances perform respective operations to implement functions of the distributed application. When a snapshot of the distributed application is generated, the generated snapshot of the distributed application should have global consistency, to be specific, it is ensured that when the snapshot point is to be restored, the application instances included in the distributed application are in a consistent causal relationship. The consistent causal relationship means that all the application instances included in the distributed application have processed tasks before the snapshot point, and when a system starts to restore from the snapshot point, a task after the snapshot point is executed, and all tasks are processed only once.

To ensure snapshot consistency of the distributed application, in the prior art, when a snapshot operation is performed on the distributed application, an application instance of the distributed application blocks a connection to a parent node after receiving a snapshot event sent by the parent node, and stops processing a task from the parent node that has sent the snapshot event. After receiving snapshot events sent by all parent nodes, the application instance generates a single-point snapshot of this application instance, releases the blocking with the parent nodes, and continues to process a task.

Before receiving the snapshot events sent by all the parent nodes and generating the snapshot, the application instance of the distributed application needs to stop processing the tasks from the parent nodes that have sent the snapshot events. As a result, a task processing capability of the distributed application is reduced.

SUMMARY

This specification describes a method for creating a consistency snapshot for a distributed application, an apparatus, and a distributed system, to resolve a problem of a low processing capability of the distributed application due to a snapshot operation.

According to a first aspect, an embodiment of the present invention provides a distributed system. The distributed system includes a control node and a plurality of execution nodes. The control node creates a consistency snapshot for a distributed application by using the plurality of execution nodes. Each execution node is associated with one application instance of the distributed application. The plurality of execution nodes include a source execution node, an intermediate execution node, and a leaf execution node. The source execution node generates a single-point snapshot of an application instance associated with the source execution node after receiving a snapshot event sent by the control node, and sends a snapshot event to all child nodes of the source execution node. Each of the intermediate execution node and the leaf execution node sequentially receives snapshot events separately sent by at least two parent nodes of this node, generates a single-point snapshot of an application instance associated with this node after receiving a first snapshot event, records a log of a task when executing the task triggered by another parent node of this node different from a parent node sending the first snapshot event. Each time one snapshot event sent by a parent node of this node is received subsequently, each of the intermediate execution node and the leaf execution node stops recording a log of a task triggered by the sender of the currently received snapshot event.

In the foregoing process of the distributed system, the plurality of execution nodes generate a single-point snapshot of each application instance included in the distributed application. In addition, when there are a plurality of parent nodes, each of the intermediate execution node and the leaf execution node further generates a log of a task that needs to be recorded, to record, by using the log, a task that is not included in the single-point snapshot and that is previous to the snapshot event, so as to ensure integrity and consistency of snapshot data. In the foregoing process, the intermediate execution node and the leaf execution node do not stop processing a task from the parent node before receiving the snapshot events sent by all the parent nodes, so as to ensure that tasks from the parent nodes can be continuously processed, thereby improving processing capability of the distributed application.

In a possible implementation, the control node obtains an attribute of each application instance included in the distributed application, determines, based on the obtained attribute of each application instance, a connection relationship between a plurality of application instances included in the distributed application, and sends the connection relationship to the plurality of execution nodes. An execution node may obtain information about a child node of the execution node based on the connection relationship, so as to broadcast a snapshot event to each child node of the execution node.

In some embodiments, the control node receives registration messages sent by the plurality of execution nodes. The registration messages carry attributes of application instances associated with the execution nodes that send the registration messages. The control node obtains the attribute of each application instance from the registration messages.

According to embodiments of the present invention, by using a registration procedure, the control node may obtain the attribute of each application instance included in the distributed application. All types of distributed applications can use the registration procedure, provided that the attribute of the application instance is reported to the control node. A type of the distributed application does not need to be limited.

The attribute of the application instance includes an instance type, a child node type, and a source node mark. The control node may create, for each application instance, an application instance object that includes an attribute of the application instance, and store the application instance object in a storage device.

In a possible implementation, after receiving an application protection plan creation message, the control node may generate a connection relationship between application instances for a distributed application specified by the application protection plan creation message, add the generated connection relationship to an application protection plan, and store the application protection plan in a storage device. Each application protection plan is corresponding to one distributed application. When the consistency snapshot of the distributed application is generated, the control node may read the connection relationship of the distributed application from the storage device based on an application protection plan identifier.

In some embodiments, before determining, based on the obtained attribute of each application instance, the connection relationship between the plurality of application instances included in the distributed application, the control node receives the application protection plan creation message. The application protection plan creation message carries an identifier of the distributed application. The control node obtains, based on the identifier of the distributed application, the attribute of each application instance included in the distributed application. The control node stores the generated connection relationship in a memory.

In another possible implementation, the control node may store the generated connection relationship in a storage device, and the connection relationship includes the identifier of the distributed application. When a consistency snapshot needs to be created for the distributed application, the control node reads the connection relationship of the distributed application from the storage device based on the identifier of the distributed application.

The connection relationship may be stored in the storage device in the form of a workflow diagram. The workflow diagram is a directed graph. The workflow diagram further includes the identifier of the distributed application. The control node may read the workflow diagram from the storage device based on the identifier of the distributed application.

In a possible implementation, the consistency snapshot of the distributed application may be automatically triggered according to a defined snapshot trigger rule, and the snapshot trigger rule may be a time-based trigger rule or an event-based trigger rule. When a condition defined by the snapshot trigger rule is met, the control node initiates an operation of creating the consistency snapshot for the distributed application.

The source execution node returns a snapshot complete event to the control node after generating the single-point snapshot. Each of the intermediate execution node and the leaf execution node returns a snapshot complete event to the control node after generating the single-point snapshot and receiving snapshot events sent by all parent nodes. After receiving snapshot complete events returned by the execution nodes associated with all the application instances of the distributed application, the control node determines that creation of the consistency snapshot of the distributed application is complete.

According to the consistency snapshot generation method, after completing the consistency snapshot of the distributed application, when data needs to be restored, the control node instructs the plurality of execution nodes to perform snapshot restoration operations. The source execution node is further configured to restore data of the source application instance based on the single-point snapshot of the source application instance. The intermediate execution node is further configured to: restore, based on the single-point snapshot of the application instance associated with the intermediate execution node, data of the application instance associated with the intermediate execution node, and execute the task included in the log. The leaf execution node is further configured to: restore, based on the single-point snapshot of the application instance associated with the leaf execution node, data of the application instance associated with the leaf execution node, and execute the task included in the log.

Because the single-point snapshot of the source application instance has recorded complete data of the application instance previous to the snapshot event, data of the source application instance at a snapshot time point (point-n-time) may be restored by using the single-point snapshot of the source application instance. When the intermediate application instance and the leaf application instance have a plurality of parent nodes, data of the intermediate application instance and the leaf application instance at a snapshot time point (point-n-time) is jointly recorded by using a single-point snapshot and a log. Therefore, after restoring data based on corresponding single-point snapshots, execution nodes associated with the intermediate application instance and the leaf application instance execute tasks included in the logs, so as to restore data of a task that is not included in the single-point snapshot and that is previous to the snapshot event, and ensure data consistency of the distributed application.

The consistency snapshot of the distributed application stored in the storage device includes a snapshot identifier. Single-point snapshots and logs of a plurality of application instances that belong to a same distributed application may be identified by using the snapshot identifier.

In a possible implementation, the control node triggers a data restoration operation after receiving a snapshot restoration request for restoring the distributed application. The snapshot restoration request carries an application identifier or a snapshot identifier of the distributed application, provided that the consistency snapshot of the distributed application can be uniquely identified.

According to a second aspect, an embodiment of the present invention provides a method for creating a consistency snapshot for a distributed application. The method is applied to a distributed system. The distributed system includes a control node and a plurality of execution nodes. The control node creates the consistency snapshot for the distributed application by using the plurality of execution nodes. Each execution node is associated with one application instance of the distributed application. The plurality of execution nodes include a source execution node, an intermediate execution node, and a leaf execution node. The method includes:

sending, by the control node, a snapshot event to the source execution node;

receiving, by the source execution node, the snapshot event sent by the control node, generating a single-point snapshot of an application instance associated with the source execution node, and sending a snapshot event to a child node of the source execution node;

sequentially receiving, by the intermediate execution node, snapshot events separately sent by at least two parent nodes of the intermediate execution node; generating a single-point snapshot of an application instance associated with the intermediate execution node after receiving a first snapshot event; recording a log of a task when executing the task triggered by another parent node, of the intermediate execution node, different from a parent node sending the first snapshot event; each time one snapshot event sent by a parent node of the intermediate execution node is received subsequently, stopping recording a log of a task triggered by the sender of the currently received snapshot event; and sending a snapshot event to a child node of the intermediate execution node after confirming that snapshot events sent by all parent nodes of the intermediate execution node are received; and sequentially receiving, by the leaf execution node, snapshot events separately sent by at least two parent nodes of the leaf execution node; generating a single-point snapshot of an application instance associated with the leaf execution node after receiving a first snapshot event; recording a log of a task when executing the task triggered by another parent node, of the leaf execution node, different from a parent node sending the first snapshot event; and each time one snapshot event sent by a parent node of the leaf execution node is received subsequently, stopping recording a log of a task triggered by the sender of the currently received snapshot event.

In a possible implementation, each of the control node and the execution nodes may be implemented by a general-purpose or dedicated physical server. The physical server includes a processor, a memory, a system bus, and a communications interface. The processor executes an instruction stored in the memory to implement functions corresponding to the control node or the execution node in the system.

In another possible implementation, an embodiment of the present invention provides a computer storage medium configured to store a computer software program executed by the control node or by the execution node. The computer storage medium includes a software program executed by a processor to perform the foregoing aspect.

In still another possible implementation, an embodiment of the present invention provides a computer program. When a physical server runs the computer program, the physical server executes functions of the control node or the execution node.

DESCRIPTION OF EMBODIMENTS

Figure 1:
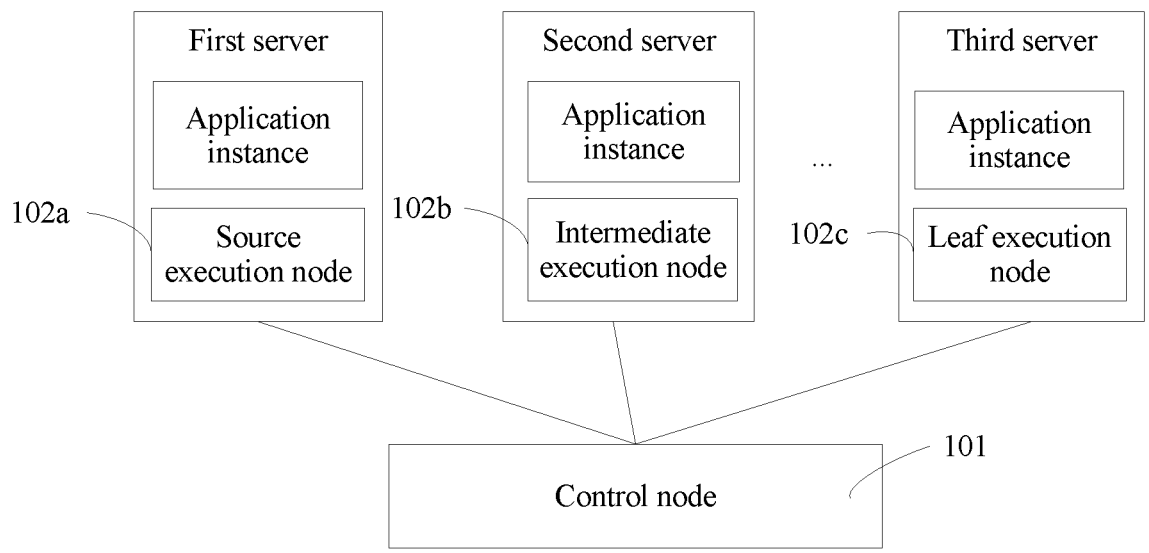
FIG. 1 is a schematic architectural diagram of a distributed system according to an embodiment of the present invention.

FIG. 1 is a schematic architectural diagram of a distributed system according to an embodiment of the present invention. The distributed system includes a control node 101 and a plurality of execution nodes 102. An execution node may be a program module running on an application instance. An execution node is referred to as application programs running in conjunction with a server, a personal computer, a host, and the like. An execution node runs on an operation system and includes routines, programs, components, data structure and the like that perform particular tasks. The description of the execution node may also apply to a control node. An execution node and a control node may be stored in both local or remote memory and/or storage devices. Each execution node 102 is associated with one application instance of a distributed application. The control node 101 creates a consistency snapshot for the distributed application by using the plurality of execution nodes 102. The plurality of execution nodes 102 are classified into three types: a source execution node 102a, an intermediate execution node 102b, and a leaf execution node 102c. In an exemplary embodiment, the source execution node 102a runs on a first server, the intermediate execution node 102b runs on a second server, and the leaf execution node 102c runs on a third server.

The control node 101 identifies a source execution node 102a associated with an application instance included in the distributed application, and sends a snapshot event to the source execution node 102a, to instruct the source execution node 102a to perform a snapshot operation. The source execution node 102a generates a single-point snapshot of an application instance associated with the source execution node 102a, and sends a snapshot event to a child node of the source execution node 102a. The intermediate execution node 102b sequentially receives snapshot events separately sent by at least two parent nodes of the intermediate execution node 102b; generates a single-point snapshot of an application instance associated with the intermediate execution node 102b after receiving a first snapshot event; records a log of a task when executing the task triggered by another parent node, of the intermediate execution node 102b, different from a parent node sending the first snapshot event; each time one snapshot event sent by a parent node of the intermediate execution node 102b is received subsequently, stops recording a log of a task triggered by the sender of the currently received snapshot event; and sends a snapshot event to a child node of the intermediate execution node 102b after confirming that snapshot events sent by all parent nodes of the intermediate execution node 102b are received. The leaf execution node 102c sequentially receives snapshot events separately sent by at least two parent nodes of the leaf execution node 102c; generates a single-point snapshot of an application instance associated with the leaf execution node 102c after receiving a first snapshot event; records a log of a task when executing the task triggered by another parent node, of the leaf execution node 102c, different from a parent node sending the first snapshot event; and each time one snapshot event sent by a parent node of the leaf execution node 102c is received subsequently, stops recording a log of a task triggered by the sender of the currently received snapshot event.

The log records a data operation process of a task, and records data to be operated.

In the foregoing process, the execution node 102 generates a single-point snapshot of each application instance included in the distributed application, and each the intermediate execution node and the leaf execution node further generates a log of a task that needs to be recorded. The task that needs to be recorded is a task after a time point at which a single-point snapshot is generated and before a snapshot event sent by another parent node different from the parent node that sends the first snapshot event is received.

In an exemplary embodiment, a non-source execution node (which may be an intermediate execution node or a leaf execution node) has two parent nodes: a parent node 1 and a parent node 2. A first snapshot event received by the non-source execution node is a snapshot event sent by the parent node 2. The non-source execution node generates a single-point snapshot of an application instance associated with the non-source execution node, continues to receive and process tasks from the two parent nodes, and does not generate a log when executing a task sent by the parent node 2. When executing a task sent by the parent node 1, the non-source execution node generates a log of the task, until a snapshot event sent by the parent node 1 is received. After receiving the snapshot event sent by the parent node 1, the non-source execution node executes a task received from the parent node 1, but does not generate a log of the task.

A first server, a second server, and a third server in FIG. 1 each may be a server cluster including a plurality of servers. In a possible implementation, the execution node 102 may be a program module running on an application instance. The execution node 102 receives a message from the control node 101, and invokes an interface of the application instance to generate a single-point snapshot and a log. The structure shown in FIG. 1 is merely an exemplary implementation scenario. A person skilled in the art may understand that different execution nodes may run on a same server, and different application instances may also run on a same server.

In the foregoing example, when the non-source execution node generates the single-point snapshot, all tasks of the parent node 2 previous to the snapshot event have been processed. However, because the snapshot event from the parent node 1 has not been received yet, within a time period from a time point at which the single-point snapshot is generated to a time point at which the snapshot event from the parent node 1 is received, data generated when the task from the parent node 1 is executed is not included in the single-point snapshot. A task that is not included in the single-point snapshot and that is within the time period is recorded by using a log in this embodiment of the present invention, so as to ensure integrity and consistency of snapshot data. In the foregoing process, the non-source execution node does not block a connection to the parent node 2 before receiving the snapshot event from the parent node 1, and does not stop processing a task from the parent node 2, so as to ensure that the task from the parent node 2 can be continuously processed, thereby improving processing capability of the distributed application.

In this embodiment of the present invention, the single-point snapshot is a snapshot of one application instance. The snapshot is a copy of application instance data at a time point when the single-point snapshot is generated. Based on the single-point snapshot of the application instance, the application instance may be rolled back to a state at the time point when the single-point snapshot is generated.

With reference to FIG. 1, after the consistency snapshot of the distributed application is complete, when the consistency snapshot of the distributed application performs a data restoration operation on the distributed application, the control node 101 restores, by using execution nodes 102, data of the application instances included in the distributed application includes the following steps:

The control node 101 receives a snapshot restoration request for restoring the distributed application, and instructs the execution nodes 102 to perform a restoration operation. The snapshot restoration request carries an identifier of the distributed application.

The source execution node 102a obtains a single-point snapshot of an application instance associated with the source execution node 102a, and restores, based on the obtained single-point snapshot, data of the application instance associated with the source execution node 102a.

Each of the intermediate execution node 102b and the leaf execution node 102c obtains a single-point snapshot and a log of an application instance associated with the respective nodes (i.e., the intermediate execution node 102b and the leaf execution node 102c, respectively), restores data of the application instance associated with respective nodes (i.e., the intermediate execution node 102b and the leaf execution node 102c, respectively) based on the obtained single-point snapshot, and enables the application instance associated with this node to execute the task included in the log.

For example, the application instance associated with the source execution node 102a may be referred to as a source application instance, the application instance associated with the intermediate execution node 102b may be referred to as an intermediate application instance, and the application instance associated with the leaf execution node 102c may be referred to as a leaf application instance.

In the foregoing process, the source execution node restores, based on the single-point snapshot of the source application instance associated with the source execution node, data of the source application instance at a snapshot time point (point-in-time). The intermediate execution node and the leaf execution node restore data of the intermediate application instance and the leaf application instance based on single-point snapshots of the intermediate application instance and the leaf application instance respectively, and execute the task recorded in the log to restore data that is not included in the single-point snapshot and that is previous to (that precedes) the snapshot time point (point-in-time), so as to ensure integrity and consistency of data restoration of the distributed application.

The type of an execution node 102 is determined by a logical location of an application instance associated with the execution node 102 in the distributed application. When the application instance associated with the execution node 102 is a source application instance, the execution node 102 is a source execution node 102a. When the application instance associated with the execution node 102 is an intermediate application instance, the execution node 102 is an intermediate execution node 102b. When the application instance associated with the execution node 102 is a leaf application instance, the execution node 102 is a leaf execution node 102c.

An embodiment of the present invention provides a method for determining, based on an attribute of an application instance, a connection relationship of application instances included in a distributed application. For example, the application instance may include the following attributes: an instance identifier, an instance type, a child node type, a source node mark, and an address and a port of a host at which the application instance is located. Based on whether there is a parent or child node, the application instance may be classified into a source application instance, an intermediate application instance, and a leaf application instance. The source application instance does not have a parent node but has a child node. The intermediate application instance has a parent node and a child node. The leaf application instance has a parent node but does not have a child node. In a possible implementation, whether the application instance is a source application instance is determined by using a "source node or not" attribute. Further, an intermediate application instance is determined with reference to a "source node or not (not a source node)" attribute and a "child node type" attribute. When a parameter of the "source node or not (not a source node)" attribute of the application instance is not a source node (not) and the "child node type" attribute is not null, the application instance is an intermediate application instance. When a parameter of the "source node or not" attribute of the application instance is not a source node and the "child node type" attribute is null (zero), the application instance is a leaf application instance. The connection relationship between the application instances is described by using a "child node type" attribute.

For example, the distributed application includes 11 application instances, and instance identifiers of the application instances are App1-ID1, App1-ID2, App1-ID11. Application instances whose "instance type" attributes are 1 include App1-ID1, App1-ID2, and App1-ID3. Application instances whose "instance type" attributes are 2 include App1-ID4 and App1-ID5. Application instances whose "instance type" attributes are 3 include App1-ID6, App1-ID7, and App1-ID8. An application instance whose "instance type" attribute is 4 includes App1-ID9. An application instance whose "instance type" attribute is 5 includes App1-ID10. An application instance whose "instance type" attribute is 6 includes App1-ID11. As shown in the following Table 1, an example of an attribute of each application instance is as follows (a host address and a port are not shown):

TABLE 1

| Instance identifier | Instance type | Child node type | Source node or not |
|---|---|---|---|
| App1-ID1 | 1 | 2 | Yes |
| App1-ID2 | 1 | 2 | Yes |
| App1-ID3 | 1 | 5 | Yes |
| App1-ID4 | 2 | 3 | No |
| App1-ID5 | 2 | 3; 5 | No |
| App1-ID6 | 3 | Null | No |
| App1-ID7 | 3 | Null | No |
| App1-ID8 | 3 | Null | No |
| App1-ID9 | 4 | 5 | Yes |
| App1-ID10 | 5 | 6 | No |
| App1-ID11 | 6 | Null | No |

Figure 2:
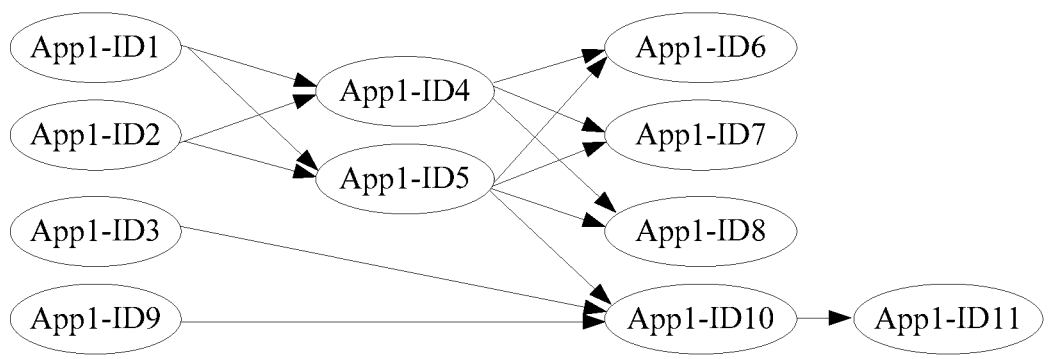
FIG. 2 is a schematic diagram of a connection relationship between a plurality of application instances included in a distributed application according to an embodiment of the present invention.

The connection relationship, between the application instances included in the distributed application, shown in Table 1 is shown in FIG. 2. Based on a location of each application instance in the connection relationship, it is determined that App1-ID1, App1-ID2, App1-ID3, and App1-ID9 are source application instances, App1-ID4, App1-ID5, and App1-ID10 are intermediate application instances, and the others are leaf application instances. Correspondingly, an execution node associated with the source application instance is a source execution node 102a, an execution node associated with the intermediate application instance is an intermediate execution node 102b, and an execution node associated with the leaf application instance is a leaf execution node 102c.

It should be noted that the method for determining the connection relationship between the application instances based on the attribute of the application instance is merely one implementation of this embodiment of the present invention. A person skilled in the art understands that the connection relationship between the application instances may be determined in another manner. For example, a connection relationship between application instances included in a distributed application may be defined by an administrator when the administrator deploys the distributed application.

When a snapshot is created for a distributed application, each application instance included in the distributed application creates a single-point snapshot of the application instance. In addition, it is necessary to ensure that tasks previous to a snapshot time point have been processed by each application instance, so as to ensure snapshot consistency of the distributed application. In this embodiment of the present invention, a task that is not included in a single-point snapshot and that is previous to the snapshot time point is recorded by using a log.

Figure 3:
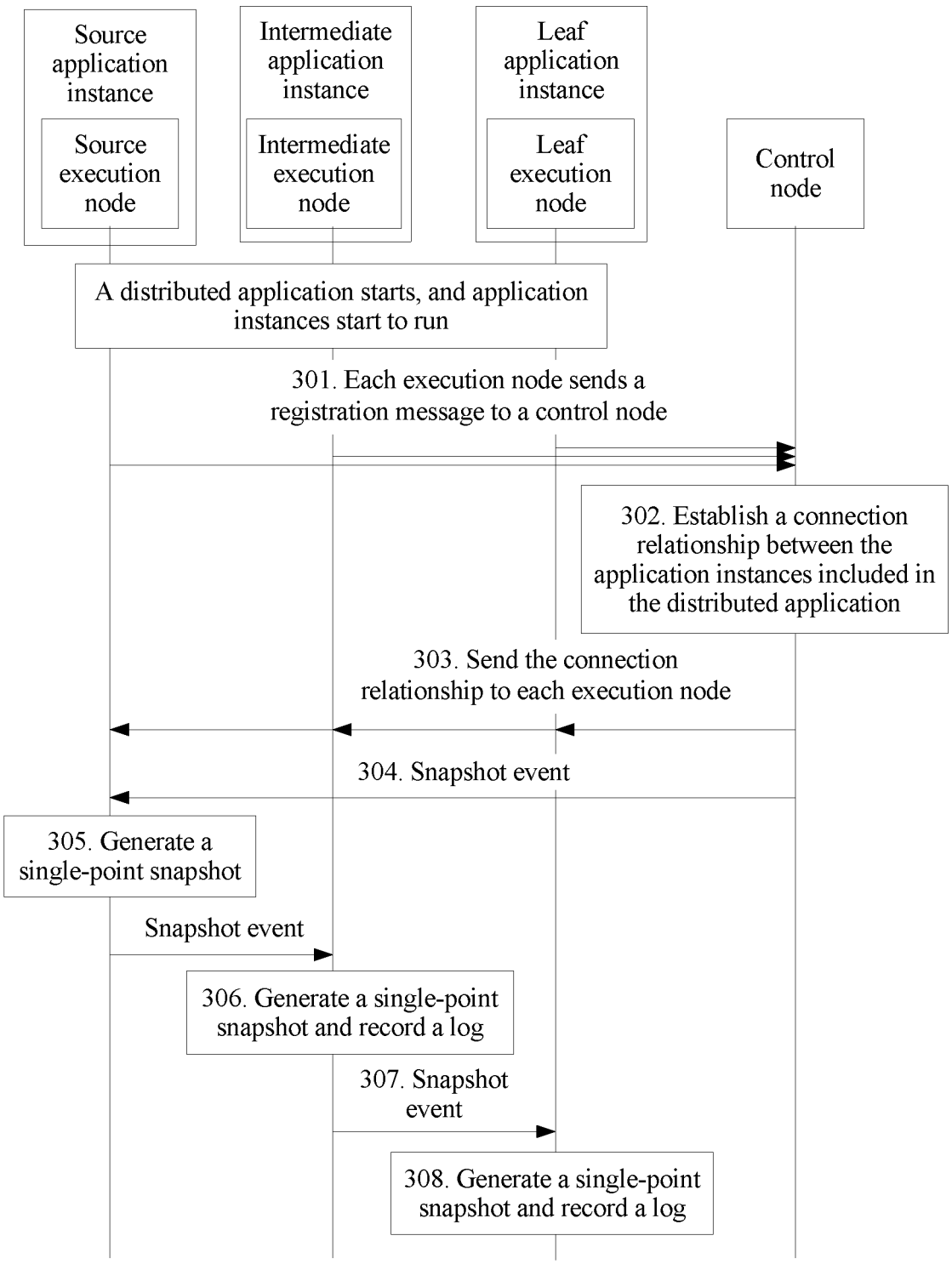
FIG. 3 is a schematic flowchart of a method for creating a consistency snapshot for a distributed application according to an embodiment of the present invention.

With reference to a system structural diagram shown in FIG. 1, FIG. 3 is a method for creating a consistency snapshot for a distributed application according to an embodiment of the present invention. The distributed application includes a plurality of application instances. The plurality of application instances run on a plurality of servers. The server may be a physical machine, a virtual machine, a container, or another type of server. The server provides an operating environment for the application instance. The method includes the following steps.

Step 301: Each execution node 102 sends a registration message to a control node 101, where the registration message carries an attribute of an application instance associated with the execution node 102.

In an implementation, the attribute of the application instance includes an instance type, a child node type, and a source node mark.

Step 302: The control node 101 obtains an attribute of each application instance included in the distributed application, and establishes a connection relationship between the application instances included in the distributed application.

In some embodiments, with reference to content corresponding to FIG. 2, the control node 101 determines a source application instance, an intermediate application instance, and a leaf application instance. The connection relationship between the application instances is established. It should be noted that the connection relationship between the application instances indicated by using the instance attribute is merely an example. A person skilled in the art may understand that the execution node 102 may alternatively specify, in the registration message, instance identifiers of all child nodes of the application instance associated with the execution node 102.

Step 303: The control node 101 sends the connection relationship to the execution nodes 102.

In a possible implementation, the control node 101 may send a complete (an entire) connection relationship to the execution nodes 102, or may send a partial connection relationship content associated with an execution node 102 to the corresponding execution node 102. For example, the control node 101 only notifies the execution node 102 of identifiers of all child nodes of the execution node 102.

Step 304: The control node 101 sends a snapshot event to a source execution node 102a to instruct the source execution node 102a to initiate a snapshot operation.

Step 305: The source execution node 102a generates a single-point snapshot of an application instance associated with the source execution node 102a, and sends a snapshot event to a child node of the source execution node 102a.

Step 306: An intermediate execution node 102b sequentially receives snapshot events separately sent by at least two parent nodes of the intermediate execution node 102b. The intermediate execution node generates a single-point snapshot of an application instance associated with the intermediate execution node 102b after receiving a first snapshot event. The intermediate execution node records a log of a task when executing the task triggered by another parent node of the intermediate execution node 102b different from a parent node sending the first snapshot event. The intermediate execution node stops recording a log of a task triggered by the sender of the currently received snapshot event each time one snapshot event sent by a parent node of the intermediate execution node 102b is received subsequently.

Step 307: The intermediate execution node 102b sends a snapshot event to a child node of the intermediate execution node 102b after confirming that snapshot events sent by all parent nodes of the intermediate execution node 102b are received.

Step 308: A leaf execution node 102c sequentially receives snapshot events separately sent by at least two parent nodes of the leaf execution node 102c; generates a single-point snapshot of an application instance associated with the leaf execution node 102c after receiving a first snapshot event. The leaf execution node records a log of a task when executing the task triggered by another parent node, of the leaf execution node 102c, different from a parent node sending the first snapshot event. Each time one snapshot event sent by a parent node of the leaf execution node 102c is received subsequently, the leaf execution node stops recording a log of a task triggered by the sender of the currently received snapshot event.

In an implementation, single-point snapshots and logs generated by the execution nodes 102 may be recorded (stored) in a storage device. When the distributed application needs to be restored, the source execution node 102a restores data of the source application instance associated with the source execution node 102a by using the single-point snapshot generated by the source execution node 102a. Each of the intermediate execution node 102b and the leaf execution node 102c restores data of the application instance associated with the respective nodes (the intermediate execution node and the leaf execution node, respectively) by using a single-point snapshot generated by this node and a log and recorded by the respective nodes (the intermediate execution node and the leaf execution node, respectively), and executes the task recorded in the log.

In FIG. 3, the description is provided by using an example in which the source execution node 102a sends the snapshot event to the intermediate execution node 102b and the intermediate execution node 102b sends the snapshot event to the leaf execution node 102c. A person skilled in the art may understand that when the child node of the source execution node 102a is the leaf execution node 102c, and the child node of the intermediate execution node 102b is another intermediate node 102b, the source execution node 102a may alternatively send the snapshot event to the leaf execution node 102c, and the intermediate execution node 102b may alternatively send the snapshot event to the another intermediate execution node 102b.

Figure 4A:
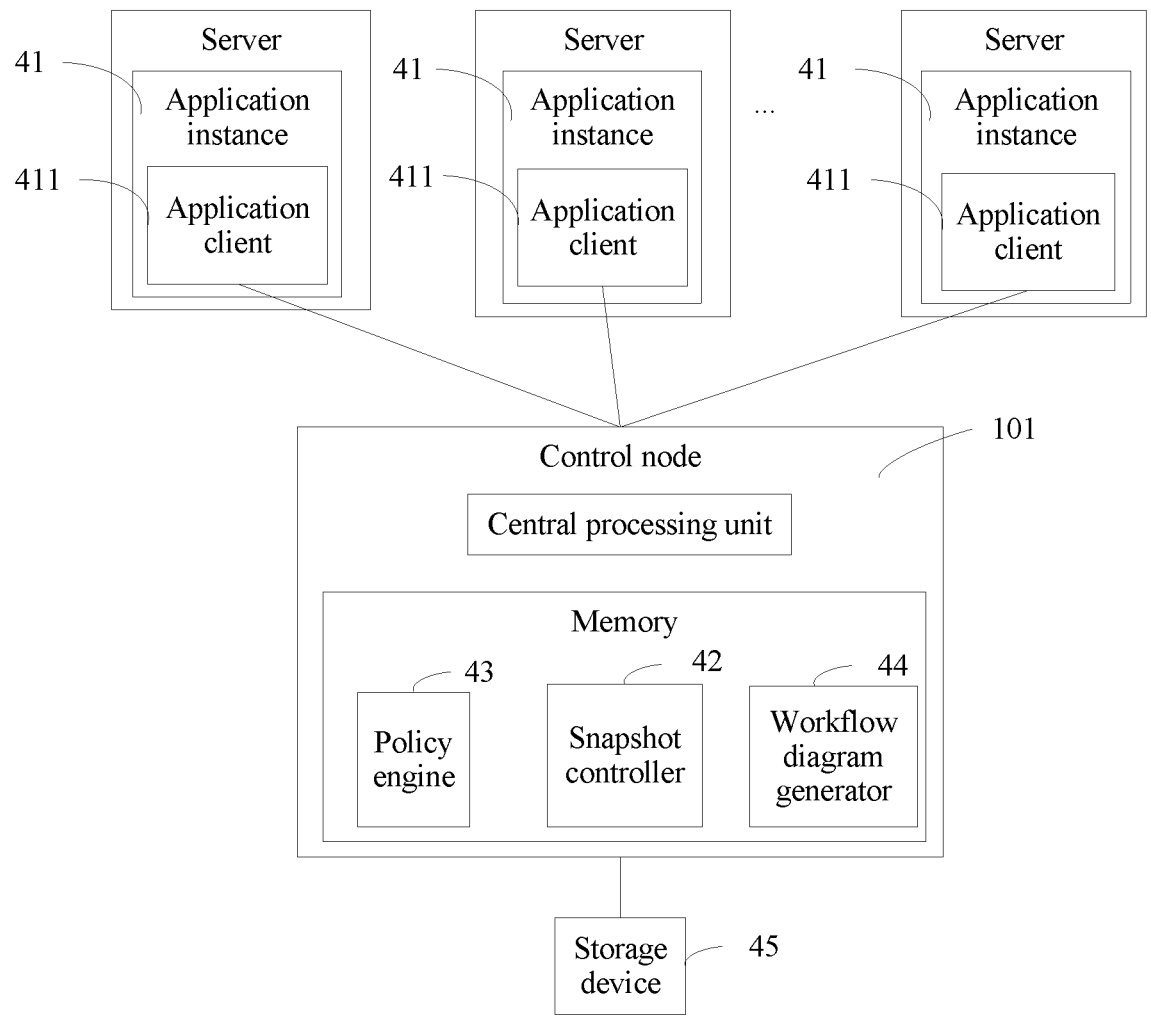
FIG. 4A is a schematic structural diagram of a distributed system according to an embodiment of the present invention.
Figure 4B:
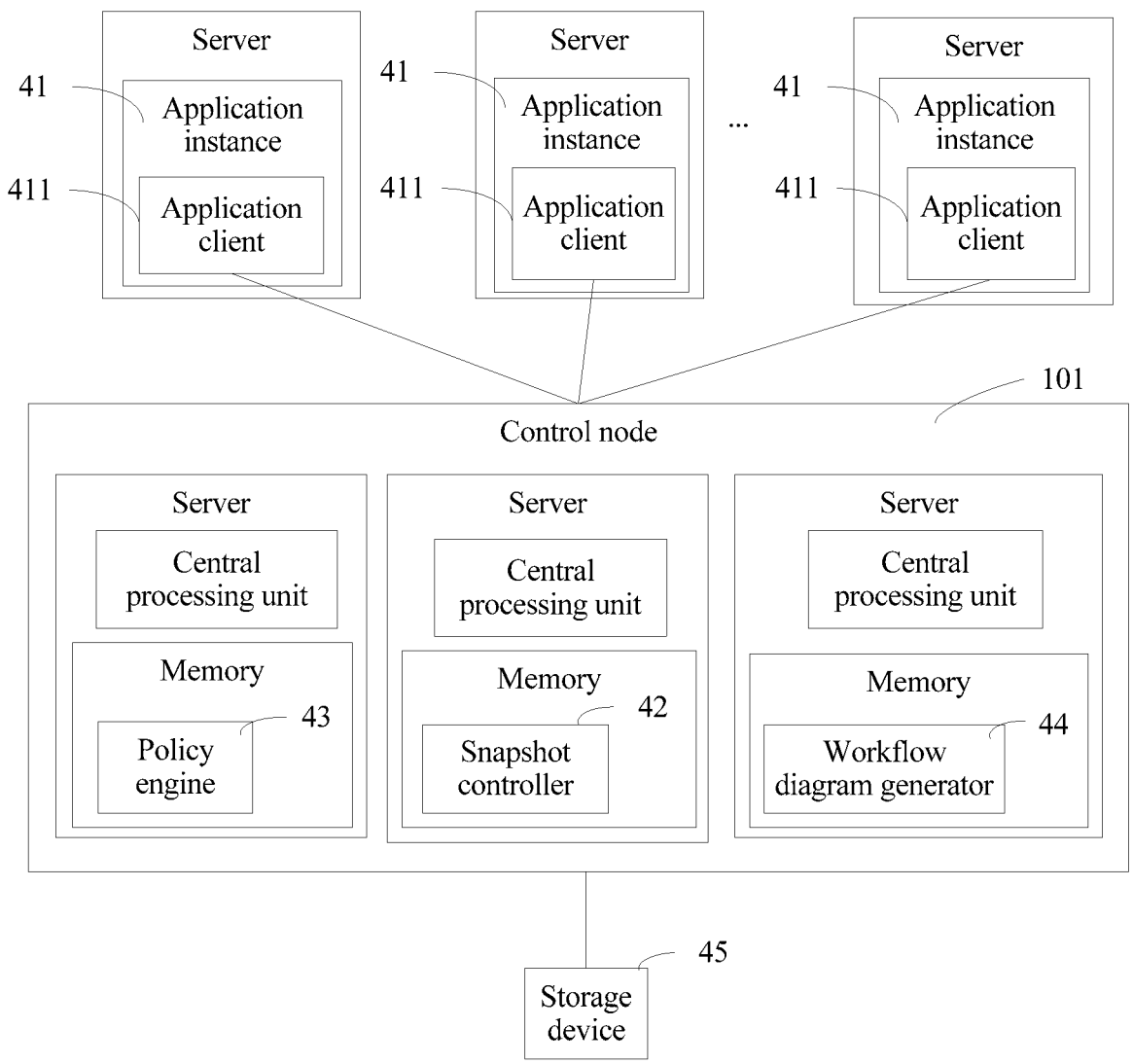
FIG. 4B is a schematic structural diagram of a distributed system according to another embodiment of the present invention.

In a possible implementation, the control node 101 may include a plurality of function modules, and the execution node 102 is an application client running on an application instance. FIG. 4A is a schematic structural diagram of a distributed system according to an embodiment of the present invention. An application client 411 runs on an application instance 41. The control node 101 includes a central processing unit and a memory. The memory stores program instructions of a snapshot controller 42, a policy engine 43, and a workflow diagram generator 44. The distributed system further includes a storage device 45. In another possible implementation, as shown in FIG. 4B, functions of the control node 101 are implemented by a server cluster. Bearer instructions of the snapshot controller 42, the policy engine 43, and the workflow diagram generator 44 are separately stored in memories of different servers.

The snapshot controller 42 is a management node, and is responsible for sending a control command to the application client 411. The snapshot controller 42 controls the application client 411 to perform a snapshot operation on the application instance 41 at which the application client 411 is located. The application instances included in the distributed application are classified into a source application instance, an intermediate application instance, and a leaf application instance. An application client associated with the source application instance is a source application client, an application client associated with the intermediate application instance is an intermediate application client, and an application client associated with the leaf application instance is a leaf application client.

The application client 411 performs the following operations: initiating application instance registration with the snapshot controller 42, to register, with the snapshot controller 42, an attribute of the application instance 41 at which the application client 411 is located; invoking an interface provided by the application instance 41 to instruct the application instance to create a single-point snapshot; recording a task from a parent node by using a log; and storing the single-point snapshot and the log to the storage device 45. The application client 411 may further maintain a heartbeat with the snapshot controller 42, so that the snapshot controller 42 can monitor a running status of the application client 411.

After application clients 411 associated with all application instances belonging to a same distributed application complete the registration, it indicates that registration of the distributed application is complete.

A storage location of the single-point snapshot and the log in the storage device 45 may be generated by the application client 411 based on a snapshot ID and an instance ID. The application client 411 synchronizes recorded snapshot metadata (including a snapshot ID, an instance ID, a storage location, and the like) to the snapshot controller 42.

The snapshot controller 42 has the following functions: receiving an application instance registration message from the application client 411; receiving a snapshot command sent by a user by using a management interface, so as to implement operations such as creation, deletion, query, and rollback of the snapshot of the distributed application; providing an application protection plan interface by using the management interface to create, modify, query and delete an application protection plan.

The policy engine 43 has the following function: A snapshot trigger rule is arranged on the policy engine 43. The snapshot trigger rule may be a time-based trigger rule or an event-based trigger rule. When a condition defined by the rule is met, the policy engine 43 triggers the snapshot controller 42 to create a snapshot for the distributed application. It should be noted that triggering a snapshot operation by using the policy engine 43 is merely an implementation. A person skilled in the art may understand that the snapshot operation may be triggered in another manner, for example, may be actively triggered by an administrator.

The workflow diagram generator 44 has the following functions: querying the snapshot controller 42 or the storage device 45 for an attribute of each application instance included in the distributed application, and generating, based on a query result, a connection relationship between all the application instances included in the distributed application. The connection relationship may be recorded in a form of a workflow diagram or a table.

The storage device 45 is configured to store information generated in a snapshot creation process, such as a snapshot, metadata, and a log, and store a workflow diagram of the distributed application.

With reference to system structures shown in FIGS. 4A and 4B, FIG. 5A and FIG. 5B are a schematic flowchart of a method for creating a consistency snapshot for a distributed application according to an embodiment of the present invention.

Figure 5A:
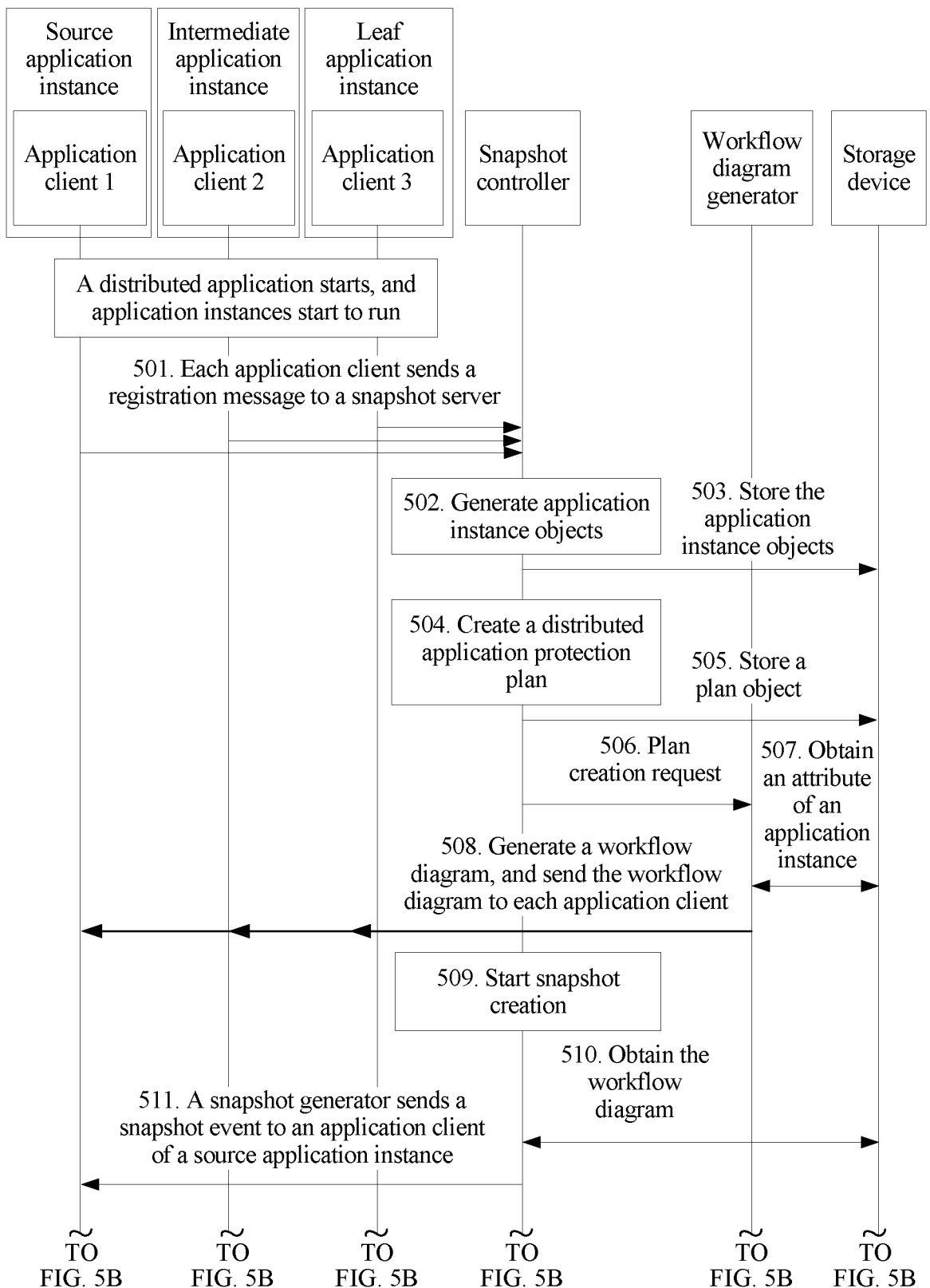
FIG. 5A and FIG. 5B are a schematic flowchart of a method for creating a consistency snapshot for a distributed application according to another embodiment of the present invention.
Figure 5B:
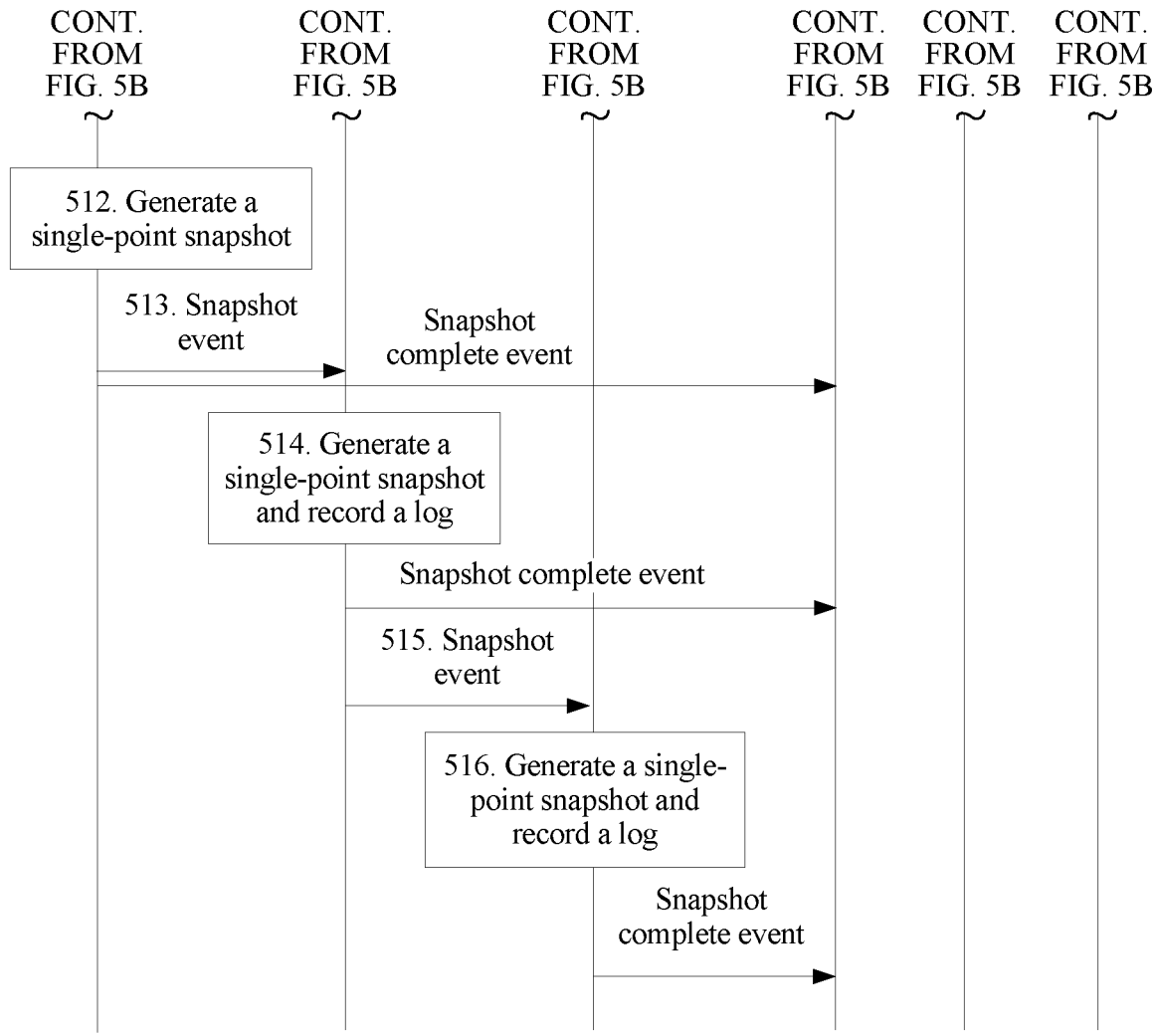

After a user deploys the distributed application in a cloud computing system, application instances of the distributed application start to run. Each application instance includes one application client. The application instances interact with a control node by using their respective application clients. Referring to FIGS. 5A and 5B, the method may include:

Step 501: The application client of each application instance sends a registration message to a snapshot controller, where the registration message carries an attribute of an application instance, and the attribute of the application instance includes an instance identifier, an instance type, a child node type, source node or not, a host address, and a port.

In a possible implementation, the instance identifier includes an application identifier and a parameter (e.g. a numerical value). The application identifier may be extracted from the instance identifier, so that the distributed application to which the application instance belongs may be determined.

Step 502: The snapshot controller receives the registration message sent by each application instance client, and generates an application instance object for each application instance, where the application instance object records an attribute of a corresponding application instance.

Step 503: The snapshot controller stores the application instance object generated for each application instance in a memory (e.g., a storage device).

Step 504: The snapshot controller creates a distributed application protection plan.

When the user initiates the application protection plan, the user invokes an application protection plan interface of a snapshot controller 42 by using a management interface, and sends a plan creation request to the snapshot controller 42. The plan creation request carries an identifier of the distributed application.

Step 505: The snapshot controller creates a plan object for the distributed application and stores the created plan object in the memory.

An attribute of the plan object includes an identifier, a status, a workflow diagram, and the like of the plan object, and the status attribute is "creating" (creating).

Step 506: The snapshot controller sends a plan creation request to a workflow diagram generator, where the plan creation request carries an identifier of the distributed application or an identifier of the plan object.

Step 507: The workflow diagram generator receives the plan creation request, reads the application instance object from a storage device based on the identifier of the distributed application or the identifier of the plan object, and obtains attributes of all application instances of the distributed application.

Step 508: The workflow diagram generator generates a workflow diagram of the distributed application based on the attributes of all the application instances of the distributed application, and sends the generated workflow diagram to the application client of each application instance.

A workflow diagram generator 44 finds (locates) the source application instance based on the obtained attribute of each application instance, and then establishes a connection relationship between each application instance and a corresponding child instance based on the attribute of each application instance. The connection relationship may be indicated in a form of a workflow diagram, e.g., the workflow diagram shown in FIG. 2.

The workflow diagram generator 44 further stores the established workflow diagram in the storage device, and changes the status of the plan object to "available". Each workflow diagram uniquely corresponds to one distributed application. It should be noted that, when the status of the plan object is "creating", it indicates that the workflow diagram of the plan object is in a to-be-created state. When the status of the plan object is "available", it indicates that the workflow diagram of the plan object has already been created.

In addition to the form of the workflow diagram, the connection relationship may be recorded in a form such as a table or a tree.

Step 509: After the snapshot operation is triggered, the snapshot controller receives the snapshot creation request, starts a snapshot creation operation, and creates a consistency snapshot for the distributed application.

When the user manually triggers or a policy engine 43 automatically triggers creating a snapshot of the distributed application, the snapshot controller 42 receives a snapshot creation request. The snapshot request carries the identifier of the distributed application or the identifier of the plan object.

Step 510: The snapshot controller obtains the workflow diagram of the distributed application from the storage device based on the identifier of the distributed application or the identifier of the plan object.

Step 511: The snapshot generator determines a source application instance of the distributed application based on the workflow diagram, and sends a snapshot event to an application client associated with each source application instance.

In some embodiments, an address of the application client is an identifier and a port of a host in which the application instance is located, and the snapshot event may be routed to the application client based on the identifier and the port of the host in which the application instance is located. The host identifier may be an IP address of a host.

Step 512: The application client of the source application instance receives the snapshot event, and generates a single-point snapshot of the source application instance.

A method for generating the single-point snapshot of the source application instance is as follows:

After a source application client 411 associated with the source application instance receives the snapshot event sent by the snapshot controller 42, the application client 411 invokes an interface of the application instance, instructs the source application instance associated with the application client 411 to generate the single-point snapshot, and broadcasts a snapshot event to a child node of the application client 411 based on the workflow diagram. The single-point snapshot is a complete copy of current data of the application instance. The application instance can be rolled back to a current state based on the single-point snapshot.

Four application instances (App1-ID1, App1-ID2, App1-ID3, and App1-ID9) in FIG. 2 are source application instances. Application clients of the four application instances receive the snapshot event sent by the snapshot controller 42, and generate single-point snapshots. The application clients of the four application instances broadcast a snapshot event to child nodes of the application instances, each of source application instances App1-ID1 and App1-ID2 broadcasts a snapshot event to App1-ID4 and App1-ID5, and each of source application instances App1-ID3 and App1-ID9 broadcasts a snapshot event to App1-ID10.

Step 513: The application client of the source application instance sends a snapshot event to a child node of the source application instance.

For example, after step 513 is performed, the application client of the source application instance sends a snapshot complete event to the snapshot controller.

Step 514: An application client of an intermediate application instance generates a single-point snapshot of the intermediate application instance, and records a log.

After a snapshot operation is complete, the application client of the intermediate application instance sends a snapshot complete event to the snapshot controller.

Step 515: After completing a snapshot operation on the intermediate application instance, the application client of the intermediate application instance sends a snapshot event to an application client of a child node.

Step 516: An application client of a leaf application instance generates a single-point snapshot of the leaf application instance, and records a log.

The application client associated with the intermediate application instance or the application client associated with the leaf application instance may have two or more parent nodes. When performing a snapshot operation, the application client associated with the intermediate application instance or the leaf application instance records a single-point snapshot and a log. In some embodiments, a method for performing the snapshot operation by the application client associated with the intermediate application instance or the leaf application instance is as follows:

After a first snapshot event sent by a parent node is received, a single-point snapshot is created, and single-point snapshot metadata is recorded. The single-point snapshot metadata includes a snapshot identifier, an application instance identifier, and a storage location, and the storage location indicates a storage location of the generated single-point snapshot. The application client enters a log mode and records a log. The log mode is as follows: After receiving a first snapshot event sent by a parent node, if the application client receives a task sent by a parent node that has not sent a snapshot event, the application client continues to process the received task, and records a log. The log records a data operation manner of the task, and records data to be operated. If the application client receives a task sent by the parent node that has sent the snapshot event, the application client continues to process the received task, but does not record a log. Each time one snapshot event of a parent node is received, the application client stops recording a log of a task of the parent node. After receiving snapshot events sent by all parent nodes, the application client of the intermediate or leaf application instance terminates the log mode, normally processes a subsequent service, and stores generated logs in the storage device 45.

A process of generating the single-point snapshot and the log by the application client of the intermediate application instance or the leaf application instance is described by using App1-ID10 in FIG. 2 as an example. According to the workflow diagram shown in FIG. 1, App1-ID10 has three parent nodes (App1-ID3, App1-ID5, and App1-ID9). It is assumed that App1-ID10 first receives a snapshot event sent by App1-ID3. An application client of App1-ID10 invokes an interface of App1-ID10 to generate a single-point snapshot of App1-ID10, and generates snapshot metadata. App1-ID10 continues to process a task from App1-ID3, but does not record a log. App1-ID10 processes a task from App1-ID5, and records a log. App1-ID10 stops recording a log after receiving a snapshot event from App1-ID5. It is assumed that App1-ID10 generates the single-point snapshot at a time point t0, and App1-ID10 receives the snapshot event of App1-ID5 at a time point t1. App1-ID10 needs to record a log when processing a task within a time period from t0 to t1 (including t0 and t1). For a task received after t1 from App1-ID3, App1-ID10 only processes the task, and does not record a log. Because a task received by the application instance is recorded in the log, log content may be read to obtain the task within the time period from t0 to t1. Processing of App1-ID9 is similar to that of App1-ID5, and details are not described herein again.

After the snapshot controller determines that snapshot operations of all the application instances of the distributed application are complete, the snapshot controller determines that consistency snapshot creation of the distributed application is complete.

In this embodiment of the present invention, the application client of the source application instance generates the single-point snapshot of the source application instance. The application client of the intermediate application instance generates the single-point snapshot of the intermediate application instance, records the log, and records, by using the log, a task that is not included in the single-point snapshot and that is previous to the snapshot event; and the leaf application instance generates the single-point snapshot of the leaf application instance, records the log, and records, by using the log, a task that is not included in the single-point snapshot and that is previous to the snapshot event, so as to ensure integrity and consistency of snapshot data. In the foregoing process, neither the intermediate application instance nor the leaf application instance needs to stop processing a task from the parent node before receiving the snapshot events sent by all the parent nodes, so as to ensure that tasks from the parent nodes can be continuously processed, thereby improving a processing capability of the distributed application.

Figure 6:
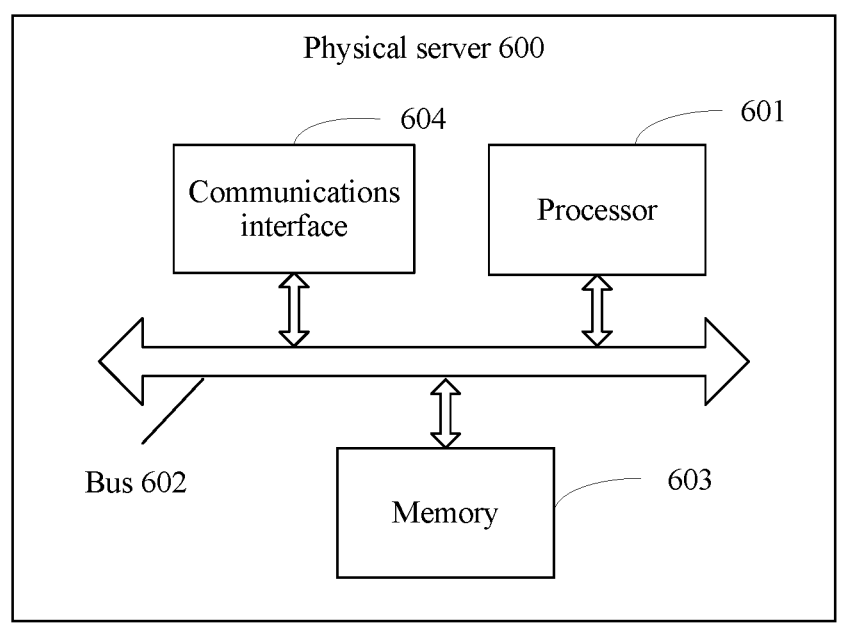
FIG. 6 is a schematic structural hardware diagram of a physical server according to an embodiment of the present invention.

The control node 101, the snapshot controller 42, the policy engine 43, and the workflow diagram generator 44 may be implemented by using a general-purpose or dedicated physical server. For example, FIG. 6 is a schematic structural diagram of hardware of a physical server according to an embodiment of the present invention. A physical server 600 includes at least one processor 601, a communications bus 602, a memory 603, and at least one communications interface 604. The memory 603 stores a computer-readable instruction. When the processor 601 reads the instruction from the memory 603, the physical server executes functions of the control node 101 and the execution node 102 in the foregoing embodiments, or executes functions of the snapshot controller 42, the policy engine 43, the workflow diagram generator 44, and the application client 411 in the foregoing embodiments.

In another possible implementation, a physical server cluster includes a plurality of physical servers. Each physical server includes a processor and a memory. A first server includes a first processor and a first memory. The first memory stores a first instruction. The first processor executes the first instruction to implement the function of the control node 101 in the foregoing embodiments. The second server includes a second processor and a second memory. The second memory stores a second instruction. The second processor executes the second instruction to implement the function of the execution node 102 in the foregoing embodiments.

In still another possible implementation, a physical server cluster includes a plurality of physical servers. Each physical server includes a processor and a memory. The processor executes an instruction in the memory. As a result, the plurality of physical servers separately execute functions of the snapshot controller 42, the policy engine 43, the workflow diagram generator 44, and the application client 411 in the foregoing embodiments.

The processor 601 may be a general-purpose central processing unit (CPU), a microprocessor, an application-specific integrated circuit (application-specific integrated circuit, ASIC), or one or more integrated circuits configured to control program execution in the solution of the present invention.

The memory 603 may be a read-only memory (read-only memory, ROM) or another type of static storage device capable of storing static information and instructions, or a random access memory (random access memory, RAM) or another type of dynamic storage device capable of storing information and instructions; or may be an electrically erasable programmable read only memory (Electrically Erasable Programmable Read Only Memory, EEPROM), a compact disc read-only memory (Compact Disc Read-Only Memory, CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of an instruction or a data structure and capable of being accessed by a computer. However, the memory is not limited thereto. The memory may exist independently and is connected to the processor by using a bus. The memory may be alternatively integrated with the processor.

The memory 603 is configured to store application program code used for executing the solution of the present invention, and the execution is controlled by the processor 501. The processor 601 is configured to execute the application program code stored in the memory 603.

It should be noted that the physical server shown in FIG. 6 merely provides possible hardware implementations of each part of a cloud computing system. A functional difference or change of each part of the system may lead to addition or deletion of a hardware component of the physical server, so as to match a function of each part of the system.

An embodiment of the present invention further provides a computer storage medium, configured to store a computer program instruction used by components shown in FIG. 1 to FIG. 5. The computer storage medium includes a program designed for performing the method embodiment. After the program stored in the computer storage medium is executed, the method for generating the consistency snapshot for the distributed application may be implemented.

Although the present invention is described with reference to specific features and the embodiments thereof, obviously, various modifications and combinations may be made to them without departing from the spirit and scope of the present invention. Correspondingly, the specification and accompanying drawings are merely examples of the present invention defined by the accompanying claims, and is considered as any of or all modifications, variations, combinations or equivalents that cover the scope of the present invention. Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A distributed system for creating a consistent snapshot, the distributed system comprising:
   a control node; and
   a plurality of execution nodes comprising a source execution node, an intermediate execution node, and a leaf execution node, each execution node being associated with an application instance of a distributed application, wherein:
   the control node creates the consistency snapshot for the distributed application by using the plurality of execution nodes and is configured to send a snapshot event to the source execution node;
   the source execution node is configured to:
      receive the snapshot event sent by the control node;
      generate a single-point snapshot of an application instance associated with the source execution node; and
      send a snapshot event to a child node of the source execution node;
   the intermediate execution node is configured to:
      sequentially receive snapshot events separately sent by at least two parent nodes of the intermediate execution node;
      generate a single-point snapshot of an application instance associated with the intermediate execution node after receiving a first snapshot event;
      record a log of a task when executing the task triggered by another parent node of the intermediate execution node different from a parent node sending the first snapshot event;
      stop recording a log of a task triggered by the parent node each time one snapshot event sent by a parent node of the intermediate execution node is received subsequently; and
      send a snapshot event to a child node of the intermediate execution node after confirming that snapshot events sent by all parent nodes of the intermediate execution node are received; and
   the leaf execution node is configured to:
      sequentially receive snapshot events separately sent by at least two parent nodes of the leaf execution node;
      generate a single-point snapshot of an application instance associated with the leaf execution node after receiving a first snapshot event;
      record a log of a task when executing the task triggered by another parent node of the leaf execution node different from a parent node sending the first snapshot event; and stop recording a log of a task triggered by a sender of a currently received snapshot event each time one snapshot event sent by a parent node of the leaf execution node is received subsequently.

2. The system according to claim 1, wherein the control node is further configured to:
obtain an attribute of each application instance comprised in the distributed application; and
determine, based on the obtained attribute of the application instance, a connection relationship between a plurality of application instances comprised in the distributed application; and
send the connection relationship to the plurality of execution nodes.

3. The system according to claim 2, wherein the attribute of each application instance comprises an instance type, a child node type, and a source node mark.

4. The system according to claim 2, wherein the control node is further configured to:
receive an application protection plan creation message, the application protection plan creation message carrying an identifier of the distributed application;
obtain, based on the identifier of the distributed application, the attribute of each application instance comprised in the distributed application; and
store the connection relationship in a memory.

5. The system according to claim 1, wherein the source execution node is further configured to return a snapshot complete event to the control node after generating the single-point snapshot;
each of the intermediate execution node and the leaf execution node is further configured to return a snapshot complete event to the control node after generating the single-point snapshot and receiving snapshot events sent by all parent nodes; and
the control node is further configured to determine, after receiving snapshot complete events returned by the execution nodes associated with all application instances of the distributed application, that creation of the consistency snapshot of the distributed application is complete.

6. The system according to claim 1, wherein the control node is further configured to instruct the plurality of execution nodes to perform a snapshot restoration operation;
the source execution node is further configured to restore data of the application instance associated with the source execution node based on the single-point snapshot of the source application instance;
the intermediate execution node is further configured to:
restore, based on the single-point snapshot of the application instance associated with the intermediate execution node, data of the application instance associated with the intermediate execution node; and
execute the task comprised in the log; and
the leaf execution node is further configured to:
restore, based on the single-point snapshot of the application instance associated with the leaf execution node, data of the application instance associated with the leaf execution node; and
execute the task comprised in the log.

7. A method for creating a consistency snapshot for a distributed application in a distributed system, the distributed system comprising a control node and a plurality of execution nodes, each execution node being associated with an application instance of the distributed application, the plurality of execution nodes comprising a source execution node, an intermediate execution node, and a leaf execution node, the method comprising:
sending, by the control node, a snapshot event to the source execution node;
receiving, by the source execution node, the snapshot event sent by the control node;
generating, by the source execution node, a single-point snapshot of an application instance associated with the source execution node; and
sending, by the source execution node, a snapshot event to a child node of the source execution node;
sequentially receiving, by the intermediate execution node, snapshot events separately sent by at least two parent nodes of the intermediate execution node;
generating, by the intermediate execution node, a single-point snapshot of an application instance associated with the intermediate execution node after receiving a first snapshot event;
recording, by the intermediate execution node, a log of a task when executing the task triggered by another parent node of the intermediate execution node different from a parent node sending the first snapshot event;
stopping, by the intermediate execution node, recording a log of a task triggered by the parent node each time one snapshot event sent by a parent node of the intermediate execution node is received subsequently; and
sending, by the intermediate execution node, a snapshot event to a child node of the intermediate execution node after confirming that snapshot events sent by all parent nodes of the intermediate execution node are received; and
sequentially receiving, by the leaf execution node, snapshot events separately sent by at least two parent nodes of the leaf execution node;
generating, by the leaf execution node, a single-point snapshot of an application instance associated with the leaf execution node after receiving a first snapshot event;
recording, by the leaf execution node, a log of a task when executing the task triggered by another parent node of the leaf execution node different from a parent node sending the first snapshot event; and
stopping, by the leaf execution node, recording a log of a task triggered by the sender of the currently received snapshot event each time one snapshot event sent by a parent node of the leaf execution node is received subsequently.

8. The method according to claim 7, before sending, by the control node, the snapshot event to the source execution node, further comprising:
obtaining, by the control node, an attribute of each application instance comprised in the distributed application; and
determining, by the control node based on the obtained attribute of the application instance, a connection relationship between a plurality of application instances comprised in the distributed application; and
sending the connection relationship to the plurality of execution nodes.

9. The method according to claim 8, further comprising, before determining, by the control node, the connection relationship between the plurality of application instances comprised in the distributed application:
receiving, by the control node, an application protection plan creation message, the application protection plan creation message carrying an identifier of the distributed application; and obtaining, based on the identifier of the distributed application, the attribute of each application instance comprised in the distributed application.

10. The method according to claim 7, further comprising:
returning, by the source execution node, a snapshot complete event to the control node after generating the single-point snapshot;
returning, by each of the intermediate execution node and the leaf execution node, a snapshot complete event to the control node after generating the single-point snapshot and receiving snapshot events sent by all parent nodes; and
determining, by the control node after receiving snapshot complete events returned by the execution nodes associated with all the application instances of the distributed application, that creation of the consistency snapshot of the distributed application is complete.

11. The method according to claim 7, further comprising:
instructing, by the control node, the plurality of execution nodes to perform a snapshot restoration operation;
restoring, by the source execution node, data of the source application instance based on the single-point snapshot of the source application instance;
restoring, by the intermediate execution node based on the single-point snapshot of the application instance associated with the intermediate execution node, data of the application instance associated with the intermediate execution node, and executing the task comprised in the log; and
restoring, by the leaf execution node based on the single-point snapshot of the application instance associated with the leaf execution node, data of the application instance associated with the leaf execution node, and executing the task comprised in the log.

12. A physical server cluster, comprising:
a first physical server comprises a first processor and a first memory, the first memory stores a first instruction, and the first processor executes the first instruction to send a snapshot event to the source execution node;
a second physical server comprises a second processor and a second memory, the second memory stores a second instruction, and the second processor executes the second instruction to receive the snapshot event sent by the control node, generate a single-point snapshot of an application instance associated with the source execution node, and send a snapshot event to a child node of the source execution node;
a third physical server comprises a third processor and a third memory, the third memory stores a third instruction, and the third processor executes the third instruction to sequentially receive snapshot events separately sent by at least two parent nodes of the intermediate execution node; generate a single-point snapshot of an application instance associated with the intermediate execution node after receiving a first snapshot event; record a log of a task when executing the task triggered by another parent node, of the intermediate execution node, different from a parent node sending the first snapshot event; each time one snapshot event sent by a parent node of the intermediate execution node is received subsequently, stop recording a log of a task triggered by the parent node; and send a snapshot event to a child node of the intermediate execution node after confirming that snapshot events sent by all parent nodes of the intermediate execution node are received; and
a fourth physical server comprises a fourth processor and a fourth memory, the fourth memory stores a fourth instruction, and the fourth processor executes the fourth instruction to sequentially receive snapshot events separately sent by at least two parent nodes of the leaf execution node; generate a single-point snapshot of an application instance associated with the leaf execution node after receiving a first snapshot event; record a log of a task when executing the task triggered by another parent node, of the leaf execution node, different from a parent node sending the first snapshot event; and each time one snapshot event sent by a parent node of the leaf execution node is received subsequently, stop recording a log of a task triggered by the sender of the currently received snapshot event.

13. The physical server cluster according to claim 12, wherein the first processor executes the first instruction to obtain an attribute of each application instance comprised in the distributed application; and determine, based on the obtained attribute of the application instance, a connection relationship between a plurality of application instances comprised in the distributed application, and send the connection relationship to the plurality of execution nodes.

14. The physical server cluster according to claim 13, wherein the attribute of the application instance comprises an instance type, a child node type, and a source node mark.

15. The physical server cluster according to claim 13, wherein the first processor executes the first instruction to receive an application protection plan creation message, and the application protection plan creation message carries an identifier of the distributed application; obtain, based on the identifier of the distributed application, the attribute of each application instance comprised in the distributed application; and store the generated connection relationship in a storage space.

* * * * *